3,781,290
PHENOXYPHENYL PHENYLTHIOPHENYL AND PHENYLAMINOPHENYL PIPERAZINYLTHIOUREAS
Ruediger Spaun, Bottmingen, Alain Claude Rochat, Birsfelden, Jean-Jacques Gallay, Magden, and Paul Brenneisen, Basel, Switzerland, assignors to Ciba-Geigy Corporation, Ardsley, N.Y.
No Drawing. Filed Aug. 27, 1971, Ser. No. 175,723
Claims priority, application Switzerland, Sept. 2, 1970, 13,111/70; Dec. 23, 1970, 19,065/70
Int. Cl. C07d 51/70
U.S. Cl. 260—268 C    10 Claims

ABSTRACT OF THE DISCLOSURE

New thioureas in which a p-phenoxyphenyl, p-phenylthio-phenyl or p-phenylaminophenyl radical is attached to one nitrogen atom and which are substituted at the other nitrogen atom either by two lower alkyl groups or a polymethylene bridging member of 2 to 6 carbon atoms, whereby one of the methylene groups can be replaced by an optionally substituted imino group, processes for the production of the new compounds and compositions containing these compounds. Particularly useful as anthelmintic agents are compounds of the formula

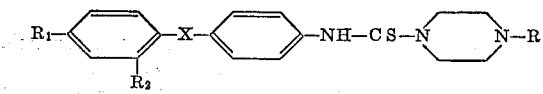

in which $R_1$ is hydrogen, chlorine, bromine, $C_1$–$C_4$ alkyl, $C_1$–$C_4$ alkylthio or $C_1$–$C_4$ alkoxy; $R_2$ is hydrogen, $C_1$–$C_4$ alkyl or nitro; X is oxygen, sulfur or imino; and R is $C_1$–$C_4$ alkyl, phenyl, $C_1$–$C_4$ hydroxyalkyl or ethoxy carbonyl.

---

The present invention relates to new thioureas, a process for the manufacture of these compounds and their use for combating parasitic Helminths.

According to the present invention there are provided thioureas of General Formula I:

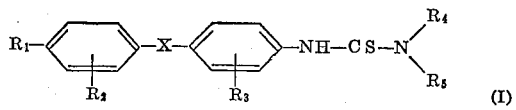

in which $R_1$ is hydrogen, halogen, hydroxyl, nitro, carboxyl, low alkyl, low alkoxy, alkoxycarbonyl, low alkylthio, amino, alkylamino, dialkylamino, acylamino, alkoxycarbonylamino or sulfamoyl, $R_2$ is hydrogen, halogen, nitro or low alkyl, alkoxycarbonyl or carboxyl, $R_3$ is hydrogen, halogen, nitro or carboxyl, and $R_4$ and $R_5$ are each low alkyl or together are a polymethylene bridge having 2 to 6 carbon atoms, wherein one methylene group can be replaced by the group >N—R in which R is hydrogen, low alkyl or hydroxyalkyl, phenyl or benzyl, and X is oxygen, sulphur, sulfonyl or imino (—NH—).

In this formula, by low alkyl for $R_1$, $R_2$, $R_4$ and $R_5$ there are to be understood straight or branched-chain alkyl groups having 1 to 4 carbon atoms, e.g. methyl, ethyl, n-propyl, isopropyl, or one of the foru isomeric butyl groups. Such alkyl groups also form the alkyl part of $R_1$ when that is alkoxy, alkylthio, alkylamino, dialkylamino, or alkoxy carbonyl. Low alkanoyl groups such as acetyl, propionyl, butyryl, valeryl, isobutyryl, are to be understood as acyl substitutes of an acyl amino group $R_1$.

Any heterocyclic group formed by groups $R_4$ and $R_5$ and the neighboring nitrogen atom preferably has 5–7 ring members. Such heterocycles are, for example, pyrrolidine, piperidine, hexahydroazepine, piperazine, N-methyl-piperazine and N-phenyl-piperazine. The group R by which the heterocycles with 2 nitrogen atoms can be substituted has the same meanings when low alkyl as given above for $R_1$, $R_2$, $R_4$ and $R_5$. By halogen, fluorine, chlorine, bromine and iodine are to be understood, chlorine and bromine being preferred.

The new thioureas of Formula I are manufactured according to the invention by reacting an iso-thiocyanate of Formula II:

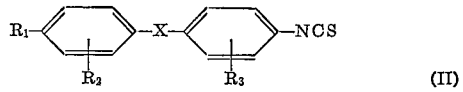

in which $R_1$, $R_2$, $R_3$ and X have the meaning given under Formula I with an amine of the Formula III:

in which $R'_4$ and $R'_5$ are each low alkyl or form together a polymethylene bridge having 3 to 6 carbon atoms, wherein one of the methylene groups can be replaced by the group >N—R' in which R' is a low alkyl group, hydroxyalkyl group, phenyl group, benzyl group, or a low alkoxycarbonyl group, and if desired transforming compounds obtained in which $R_1$ is a nitro group by reduction and compounds in which $R_1$ is an acylamino or alkoxycarbonyl amino group and/or compounds in which R' is an alkoxycarbonyl amino group by hydrolysis into compounds of Formula I in which $R_1$ is the amino group and/or R is hydrogen. The hydrolytic splitting off of low alkoxy carbonyl groups or acyl groups takes place preferably in alkali medium, for example by warming the compound obtained in aqueous alkali metal hydroxide solution.

The reaction is advantageously carried out at room temperature or slightly elevated temperature in an inert solvent. As solvents are suitable, for example, aromatic hydrocarbons, for instance benzene, toluene, or aliphatic or aromatic halogenated hydrocarbons such as methylene chloride, chloroform, chlorobenzene, as well as ether and ether compounds such as diethyl ether and dioxane, as well as N-alkylated acid amides such as dimethyl formamide as well as mixtures of the solvents with one another, also water or mixtures of the solvents with water.

The isothiocyanates of the Formula II used as starting materials can be obtained according to known methods, for example by reaction of amines of the General Formula IV

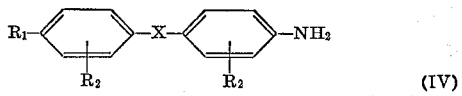

wherein $R_1$, $R_2$, $R_3$ and X have the meaning given under Formula I, with thiophosgene (c.f. Swiss Pat. No. 470,846 and Belgian Pat. No. 736.010).

The new thioureas of Formula I can also be obtained by reacting a thiocarbamicacid-derivative of Formula V:

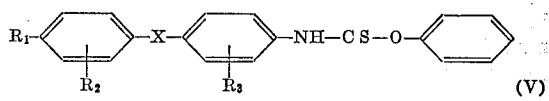

with an amine of Formula III and if desired converting compounds obtained in which $R_1$ is a nitro group by reduction and compounds by which $R_1$ is an acylamino or alkoxycarbonyl amino group and/or compounds in which R' is an alkoxycarbonyl amino group by hydrolysis into compounnds of Formula I in which $R_1$ is the amino group and/or R is hydrogen. The reaction is carried out advantageously at room temperature or slightly elevated temperature in an inert solvent. Suitable inert solvents are, for example aromatic hydrocarbons, for instance benzene, toluene, or aliphatic or aromatic halogenated hydrocarbons such as methylene chloride, chloroform, chlorobenzene, as well as ether and ether compounds, as well as N-alkylated acid amides such as dimethyl formamide as well as mixtures of the solvents with one another, also water or mixtures of the solvents with water.

The starting materials of the General Formula V can be obtained by reacting an amine of the General Formula IV with a halothiocarboxylic acid-O-phenylester in the presence of an acid binding agent. As acid binding agents there are preferably used tertiary amines such as trialkylamine, pyridine bases etc., also hydroxides and carbonates of alkali and alkaline earth metals.

A further process for the manufacture of the novel thioureas of Formula I consists in reacting an acylated amine of Formula VI:

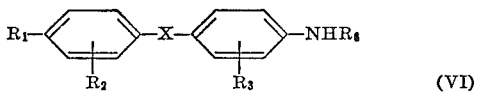

in which $R_6$ is an acyl group easily removable by hydrolysis, with a thio carbamoyl halide of Formula VII:

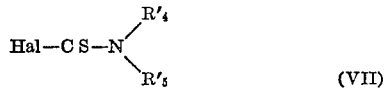

in which Hal is chlorine or bromine in the presence of an acid binding agent and alkaline hydrolyzing the resulting thiourea to remove the acyl group $R_6$, and if desired transforming compound obtained in which $R_1$ is a nitro group by reduction and compounds in which $R_1$ is an acyl amino or alkoxycarbonyl amino group and/or compounds in which $R'$ is an alkoxy carbonyl amino group by hydrolysis into compounds of Formula I in which $R_1$ is the amino group and/or R is hydrogen. In Formulae VI and VII the symbols $R_1$, $R_2$, $R'_4$ and $R'_5$ have the meanings given for Formula I and Formula III respectively.

The reaction is advantageously performed at elevated temperature, preferably at reflux temperature of the reaction mixture, in an inert solvent. Suitable inert solvents are, for example, hydrocarbons, for instance benzene, toluene, or aliphatic or aromatic halogenated hydrocarbons such as methylene chloride, chloroform, chlorobenzene, as well as ether and ether compounds such as diethyl ether and dioxane, as well as N-alkylated acid amides such as dimethylformamide as well as mixtures of the solvents with one another, also water or mixtures of the solvents with water.

The starting materials of the Formula VI are obtained according to known methods by alkylation of amines of the Formula IV.

Suitable easily split off groups $R_6$ by hydrolysis are the trifluoroacetyl group and the tertiarybutoxycarbonyl group. For the alkaline hydrolysis, preferably inorganic bases such as alkali metal hydroxides are used. As acid binding agent, particularly tertiary amines may be used, for example trialkylamine but also inorganic bases such as hydroxides and carbonates of alkali and alkaline earth metals may be used. Additionally, for this reaction amines of Formula IV can be used which are acylated by a carbobenzoxy group, in those cases where $R_1$ and $R_3$ are not nitro. The carbobenzoxy group is then removed by hydrogenolysis with catalytic hydrogen.

The new thioureas of Formula I in which one of symbols $R_1$ and $R_3$ means a group which is able to form salts, e.g. an alkyl or a dialkyl amino group or the carboxyl group, can be transformed into the corresponding salt with acids or bases which are nontoxic for human and animal organisms. As acids both inorganic and organic acids are of value, for example, hydrohalic acids, sulphuric acid, phosphoric acids, acetic acid, aminoacetic acid, butyric acid, lauric acid, stearic acid, oxalic acid, adipic acid, maleic acid, tartaric acid, lactic acid, methanesulphonic acid, p-toluenesulphonic acid, etc. As bases there should be noted particularly alkaline and alkaline earth metal hydroxides and alkanolates, as well as quaternary ammonium bases and ammonium salts.

For the manufacture of quaternary ammonium salts, the new thioureas of Formula I in which $R_1$ is a dialkyl amino group can be transformed into the corresponding ammonium salts by conventional quaternization agents such as alkyl halides, dialkyl sulphates, toluene sulphonic acid esters, etc. If the anion of the quaternary salt obtained is toxic for human and animals, then it can be exchanged by reaction with a non-toxic acid for a non-toxic anion.

The following examples will illustrate the manufacture of novel thioureas of Formula I. The subsequent table shows further thioureas which can be manufactured using the process of the example. Temperatures given are in ° C. throughout.

EXAMPLE 1

A solution of 10 g. 4-nitro-4'-isothiocyano-diphenylamine in 80 ml. toluene was treated at a temperature of 50° with stirring with a solution of 6.3 ml. dibutylamine in 20 ml. toluene. After 3 hours stirring at 50° the solution was filtered from the precipitate obtained. By recrystallizing the crude product from methanol 10.9 g. N-[4-(4'-nitroanilino)-phenyl]-N',N' - dibutylthiourea of melting point 179–183° were obtained.

EXAMPLE 2

A solution of 4 g. N-[4-phenoxyphenyl]-thiocarbamic acid-O-phenyl ester in 50 ml. toluene was reacted at a temperature of 50° for hours with 10 ml. diethylamine (15% aqueous solution). After separation of the aqueous phase the organic phase was washed with water, dried over calcium chloride, filtered and evaporated away. The recrystallization of the crude product from ethanol gave 2.4 g. N-(4-phenoxyphenyl)-N',N'-diethylthio urea of melting point 78–79°.

EXAMPLE 3

A solution of 4.9 g. 4 - nitro - 4' - trifluoracetamidodiphenylether, 2.3 g. N,N-diethylthiocarbamoyl chloride, and 2.1 ml. triethylamine in 160 ml. toluene was boiled under reflux for 12 hours. The triethylamine hydrochloride formed was filtered off and the filtrate was evaporated to dryness in vacuo. For removal of the trifluoroacetyl group the crude product was dissolved in hot benzene and boiled under reflux in the presence of 1 g. powdered KOH for 2 hours. The benzene solution was washed with water, dried over potash, filtered and evaporated off. The residue was recrystallized from ethanol. 1.8 g. N-[4-(4'-nitrophenoxy)-phenyl] - N',N' - diethylthio urea was obtained of melting point 138–140°.

Further compounds obtained are shown in the following table:

| Compound | Melting point, ° C. or Refractive Index |
|---|---|
| N-[4-(4'nitrophenoxy)-phenyl]-N'N' - dimethyl urea | 147–149 |
| N-[4-(4'-nitrophenoxy)-phenyl]-N'N' - diethylthiourea | 138–140 |
| N-[4-(4'-nitrophenoxy)-phenyl] - N'N' - dipropylthiourea | 99–101 |
| N-[4-(4'-chlorophenoxy)-phenyl] - N'N' - diethylthiourea | 81–85 |
| N-[4-(4'-nitrophenoxy)-phenyl]-N'N' - dibutylthiourea | 79–81 |
| N-[4-(2'-nitrophenoxy)-phenyl]-N'N' - diethylthiourea | 119–120 |
| N-[4-(4'-methoxyphenoxy)-phenyl]-N'N' - diethylthiourea | 85–86 |

| Compound | Melting point, °C. or Refractive Index |
|---|---|
| N-[4-(2'-nitrophenoxy)-phenyl]-N'N'-dimethylthiourea | |
| 1 | 75–77 |
| 2 | 151–152 |
| N-[4-(4'-methoxyphenoxy)phenyl]-N'N'-dimethylthiourea | 114–115 |
| N-[4-(4'-nitrophenoxy)-2-chlorphenyl]-N'N'-diethylthiourea | 119–121 |
| N-[4-(2'-methoxycarbonylphenoxy)-phenyl]-N'N'-diethylthiourea | 119–120 |
| N-[4-(4'-acetaminophenoxy)-phenyl]-N'N'-diethylthiourea | 171–173 |
| N-[4-(4'-hydroxyphenoxy)-phenyl]-N'N'-diethylthiourea | |
| 1 | 54–55 |
| 2 | 130–133 |
| N-[4-(4'-nitrophenoxy)-3-chlorphenyl]-N'N'-diethylthiourea | 115–117 |
| N-(4-phenoxyphenyl)-N'N'-diethylthiourea | 78–79 |
| N-[4-(4'-bromphenoxy)-phenyl]-N'N'-diethylthiourea | 102–103 |
| N-[4-(4'-bromphenoxy)-phenyl]-N'N'-dimethylthiourea | 143–144 |
| N-[4-(4'-chlor-3'-methylphenoxy)-phenyl]-N'N'-dimethylthiourea | 132–133 |
| N-[4-(4'-nitrophenoxy)-3-chlorphenyl]-N'N'-dimethylthiourea | 174–175 |
| N-(4-phenoxy-2-nitrophenyl)-N'N'-diethylthiourea | 99–100 |
| N-[4-(4'-chlor-3'-methylphenoxy)-phenyl N'N'-diethylthiourea | 111–112 |
| N-(4-phenoxyphenyl)-N'N'-dimethylthiourea | 127–128 |
| N-[4-(4'-nitrophenoxy)-phenyl]-N'N'-pentamethylenthiourea | 149–153 |
| N-[4-(4'-nitrophenoxy)-phenyl]-N'N'-ethylenthiourea | 168–173 |
| N-[4-('-nitropenoxy)-2-chlorphenyl]-N'N'-dimethylthiourea | 179–180 |
| N-[4-(4'-sulfamylphenoxy)-phenyl]-N'N'-diethylthiourea | 164–165 |
| N-[4-(4'-sulfamylphenoxy)-phenyl]-N'N'-dimethylthiourea | 173–174 |
| N-[4-(4'-methylphenoxy)-phenyl]-N'N'-diethylthiourea | 105–106 |
| N-[4-(4'-methylphenoxy)-phenyl]-N'N'-dimethylthiourea | 115–116 |
| N-(4-phenoxy-2-nitrophenyl)-N'N'-dimethylthiourea | 71–72 |
| N-[4-(4'-chlorphenoxy)-3-carboxyphenyl]-N'N'-diethylthiourea | 84–85 |
| N-[4-(4'-methoxyphenoxy)-phenyl]-N'N'-dibutylthiourea | 59–60 |
| N-[4-(4'-methoxyphenoxy)-phenyl]-N'N'-dihexylthiourea | |
| $n_D^{20}$ | [1] 1,5695 |
| N-[4-(4'-nitrophenoxy)-phenyl]-N'N'-dihexylthiourea | 95–98 |
| N-[4-(4'-nitrophenoxy)-phenyl]-N'-methyl-N'-ethylthiourea | 144–145 |
| N-[4-(4'-nitrophenoxy)-phenyl]-N'-methyl-N'-propylthiourea | 118–119 |
| N-[4-(4'methoxyphenoxy)-phenyl]-N'-methyl-N'-propylthiourea | 100–102 |
| N-[4-(4'-N,N-dimethylaminophenoxy]-N'N-diethylthiourea | 129–130 |
| N-[4-(4'-N,N-dimethylaminophenoxy)-phenyl]-N'N'-dimethylthiourea | 122–124 |
| N-[4'(4'-chlorphenoxy)-phenyl]-N'N'-dihexylthiourea | 72–73 |
| N-[4-(4'-bromphenoxy)-phenyl]-N'N'-dihexylthiourea | 60–61 |

| Compound | Melting point, °C. or Refractive Index |
|---|---|
| N-[4-(4'-aminophenoxy)-phenyl]-N'N'-diethylthiourea | 149–151 |
| N-[4-(4'-chlorphenoxy)-phenyl]-N'N'-dibutylthiourea | |
| $n_D^{20}$ | [1] 1,588 |
| N-[4-(4'-N,N-dimethylaminophenoxy)-phenyl]-N'N'-dihexylthiourea | |
| $n_D^{20}$ | [1] 1,568 |
| N-[4-(4'-methylphenoxy)-phenyl]-N'N'-dibutylthiourea | |
| $n_D^{20}$ | [1] 1,5725 |
| N-[4-(4'-bromphenoxy)-phenyl]-N'N'-dibutylthiourea | |
| $n_D^{20}$ | [1] 1,5925 |
| N-[4-(4'-N,N-dimethylaminophenoxy)-phenyl]-N'N'-dibutylthiourea | |
| $n_D^{20}$ | [1] 1,6103 |
| N-[4-(4'-methylphenoxy)-phenyl]-N'N'-dihexylthiourea | |
| $n_D^{20}$ | [1] 1,5631 |
| N-[4-(4'-methoxyphenoxy)-phenyl]-N'-ethyl-N'-sec.butylthiourea | 89–90 |
| N-[-(4'-nitrophenoxy)-phenyl]-N'-ethyl-N'-sec.-butylthiourea | 104–105 |
| N-[4-(4'-acetaminophenoxy)-phenyl]-N'-ethyl-N'-sec.-butylthiourea | 158–160 |
| N-[4-(4'-aminophenoxy)-phenyl]-N'N'-dibutylthiourea | |
| $n_D^{20}$ | [1] 1,6082 |
| N-[4-(4'-methylphenoxy-phenyl]-N'-ethyl-N'-sec.-butylthiourea | |
| $n_D^{20}$ | [1] 1,6078 |
| N-[4-(4'-methylthiophenylthio)-phenyl]-N'N'-dimethylthiourea | 156–157 |
| N-[4-(4'-methylphenylthio)-phenyl]-N'N'-diethylthiourea | 74–75 |
| N-[4-(4'-chlorphenylthio)-phenyl]-N'N'-dimethylthiourea | 163–164 |
| N-[4-(4'-acetaminophenylthio)-phenyl]-N'N'-diethylthiourea | 190–191 |
| N-[4-(4'-acetaminophenylthio)-phenyl]-N'N'-dimethylthiourea | 198–199 |
| N-[4-(4'-nitrophenylthio)-phenyl]-N'N'-diethylthiourea | 109–112 |
| N-[4-(4'-chlophenylthio)-phenyl]-N'N'-diethylthiourea | 70–71 |
| N-[4-(4'-chlorphenylthio)-3-carboxyphenyl]-N'N'-dimethylthiourea | 80–82 |
| N-[4-(4'-methylphenylthio)-phenyl]-N'-ethyl-N'-sec.-butylthiourea | 98–99 |
| N-[4-(4'-nitrophenylsulfonyl)-phenyl]-N'N'-diethylthiourea | 165–170 |
| N-(4-phenylsulfonylphenyl)-N'N-diethylthiourea | [2] 141–151 |
| N-[4-(4'-chlorphenylthio)-phenyl]-N'N'-diethylthiourea | 128–131 |
| N-[4-(4'-chloranilino)-phenyl]-N'N'-diethylthiourea | 119–122 |
| N-[4-(4'-methylanilino)-phenyl]-N'N'-diethylthiourea | 108–111 |
| N-[4-(4'-methylanilino)-phenyl]-N'N-diethylthiourea | 91–94 |
| N-[4-(4'-nitroanilino)-phenyl]-N'N'-diethylthiourea | 165–169 |
| N-[4-(4'-bromanilino)-phenyl]-N'N'-diethylthiourea | 131–134 |
| N-(4-anilinophenyl)N'N'-diethylthiourea | 120–123 |
| N-[4-(4'-chloranilino)-phenyl]-N'N'-dimethylthiourea | 158–163 |
| N-[4-(4'-methylthioanilino)-phenyl]-N'N'-diethylthiourea | 129–132 |

See footnotes at end of table.

| Compound | Melting point, °C. or Refractive Index |
|---|---|
| N-[4-(4'-chloranilino)-phenyl] - N'N' - pentamethylenthiourea | 146–150 |
| N-[4-(3'-methylanilino) - phenyl] - N',N' - diethylthiourea | 121–127 |
| N-[4-(3'4'-dimethylanilino)-phenyql]-N'N' - diethylthiourea | 128–130 |
| N-[4-(4'-methylanilino) - phenyl] - N'N' - dimethylthiourea | 143–145 |
| N-[4-(4'-methoxyanilino)-phenyl] - N'N' - diethylthiourea | 52–55 |
| N-[4-(4'-nitroanilino) - phenyl] - N'N'-pentamethylenthiourea | 179–184 |
| N-[4-(4'-chloranilino)-phenyl] - N'N' - ethylenthiourea | 172–180 |
| N-[4-(4'-methoxyanilino) - 3 - carboxyphenyl]-N'N'-diethylthiourea | 116–121 |
| N-[4-(3'-chloranilino)-phenyl] - N'N' - diethylthiourea | 122–125 |
| N-[4-(4'-ethylanilino)-phenyl] - N'N' - dibutylthiourea | 114–117 |
| N-[4-(4'-methylanilino) - phenyl] - N'N' - dibutylthiourea | 126–130 |
| N-[4-(4'-chloranilino)-phenyl] - N'N' - dibutylthiourea | 129–132 |
| N-[4-(2',4'-dinitroanilino) - phenyl] - N'N' - diethylthiourea | 148–158 |
| N-[4-(3',4'-dimethylanilino)-phenyl]-N,N, - dibutylthiourea | 93–98 |
| N-[4-(4'-nitroanilino)-phenyl] - N'N' - dibutylthiourea | 179–183 |
| N-[4-(4'-nitroanilino)-phenyl - N'N' - dihexylthiourea | 134–139 |
| N-[4-(4'-bromanilino)-phenyl] - N'N' - dibutylthiourea | 128–132 |
| N[4-(4'-N,N-dimethylaminoanilino) - phenyl]-N'N'-dibutylthiourea | 98 |
| N-[4-(4'-methoxyanilino)-phenyl] - N'N' - dibutylthiourea | 115–120 |
| N-[4-(4'-methoxyanilino)-phenyl] - N',N' - dimethylthiourea | 85–95 |
| N-[4-(4'-chloranilino)-phenyl] - N' - methyl-N'-propylthiourea | 135–138 |
| N-[4-(4'-nitroanilino)-phenyl]-N' - methyl - N'-propylthiourea | 159–161 |
| N-[4-(4'-hydroxyanilino) - phenyl] - N',N' - diethylthiourea | 72–76 |
| N-[4-(3',4'-dimethylanilino)-phenyl]-N' - ethyl-N'-sec-butylthiourea | 95–100 |
| N-[4-(4'-methoxyanilino)-phenyl] -N' - ethyl-N'-sec-butylthiourea | 80–84 |
| N-[4-(3'-methoxyanilino)-phenyl] - N',N' - diethylthiourea | 134–140 |
| 4-methoxy-4'-(N - methylpiperazinyl) - thiocarbonylamino-diphenylether | 138–140 |
| 4-methyl-4'-(N-methylpiperazinyl) - thiocarbonylamino-diphenylether | 134–137 |
| 4-nitro-4'-(N-methylpiperazinyl) - thiocarbonylamino-diphenylether | 168–169 |
| 4-brom-4' - (N - methylpiperazinyl) - thiocarbonylamino-diphenylether | 151–152 |
| 4-methylthio-4'-(N - methylpiperazinyl) - thiocarbonylamino-diphenylamine | 164–166 |
| 4-methyl-4'-(N - methylpiperazinyl) - thiocarbonylamino-diphenylamine | 150–152 |
| 4-chlor-4'-(N-methylpiperazinyl) - thiocarbonylamino-diphenylamine | 165–167 |
| 4-nitro-4'-(N-methylpiperazinyl) - thiocarbonylamino-diphenylamine | 191–196 |
| 4-chlor-3'-carboxy-4' - (N - methylpiperazinyl)-thiocarbonylamino-diphenylamine | 188–190 |
| 4-nitro-4'-(N - phenylpiperazinyl)thiocarbonylamino-diphenylether | 183–188 |
| 4 - (n-methylpiperazinyl) - thiocarbonylamino-diphenylether | 138–142 |
| 4 - (n - phenylpiperazinyl) - thiocarbonylamino-diphenylether | 170–173 |
| 4-nitro - 4' - (n-ethoxycarbonylpiperazinyl)-thiocarbonylamino-diphenylether | 185–188 |
| 4-nitro - 4' - (N-hydroxyethylpiperazinyl)-thiocarbonylamino-diphenylether | 165–167 |
| 4 - (N - hydroxyethylpiperazinyl)-thiocarbonylamino-diphenylether | 137–140 |
| 2,4 - dinitro - 4' - (N-methylpiperazinyl)-thiocarbonylamino-diphenylether | 197–199 |
| 4 - bromo - 4' - (N-ethoxycarbonylpiperazinyl)-thiocarbonylamino-diphenylether | 140–144 |
| 4-nitro - 4' - (N-ethylpiperazinyl)-thiocarbonylamino-diphenylether | 159–163 |
| 4 - methoxy - 4' - (N-ethylpiperazinyl)-thiocarbonylamino-diphenylether | 138–140 |
| 4 - nitro - 4' - (N-propylpiperazinyl)-thiocarbonylamino-diphenylether | 149–150 |
| 4 - nitro - 4' - (N-butylpiperazinyl)-thiocarbonylamino-diphenylether | 124–126 |
| 4 - (N - i - propylpiperazinyl) - thiocarbonylamino-diphenylether | 130–133 |
| 4 - nitro - 4' - (N - i - propylpiperazinyl)-thiocarbonylamino-diphenylether | 155–158 |
| 4 - nitro - 4' - (N - phenylpiperazinyl)-thiocarbonylamino-diphenylamine | 235–240 |
| 4 - methylthio - 4' - (N-phenylpiperazinyl)-thiocarbonylamino-diphenylamine | 175–180 |
| 4 - nitro - 4' - (N - hydroxyethylpiperazinyl)-thiocarbonylamino-diphenylamine | 195–200 |
| 2,4-dimethyl - 4' - (N-ethylpiperazinyl)-thiocarbonylamino-diphenylamine | 167–171 |

See footnotes at end of table.

[1] Refractive index.
[2] With decomposition.

The new thio ureas of Formula I are suitable for combating parasitic helminths and their stages of development. Among the endo-parasites which attack domestic and useful animals, parasitic helminths are particularly dangerous pests. Thus it is often the case with attacked animals that there is both a retarded growth and disease is released by the helminth attack which the animals die from. It is thus of the greatest importance to develop agents which on the one hand will prophylactically hinder the attack by such endo-parasites, but which on the other hand will also have a good anthelmintic action with a broad spectrum of activity. Previously known ureas and thio ureas with anthelmintic action have not heretofore been satisfactory because in compatible doses they have insufficient action while in therapeutically active doses they show undesirable side effects or alternatively have too narrow a spectrum of activity.

Ureas such as 3,5-bis-trifluoromethyl-4'-nitrodiphenyl urea and 3,5,3' - tris - trifluoromethyldiphenyl urea (both compounds included in Belgian Pat. 616,735, the first in the examples thereof) also show good activity but in the concentrations required to be used, show also a strong irritant activity, which leads to extremely thin liquid droppings in hens and diarrhea in sheep and horses. Thus, for example, the thio ureas known from British patent specification 956,520, the 3,3',5 - tris - trifluoromethyldiphenylthio urea and the N-(3,5 - bis - trifluoromethylphenyl) - N' - (3 - chlorophenyl)-thio urea show no action at a concentration of a 100 mg. per kg. body weight against Ascaridia gelli in hens and enterobius in mice, while giving substantial toxic side effects at 500 mg./kg. body weight.

The thio ureas of Formula I according to the invention are not toxic in normal use concentrations (compare the following tests). They are very compatible with domestic and useful animals and have a broad spectrum of activity. The new active substances are particularly suitable for combating parasitic nematodes (e.g. Ascaridae, Trichostrongylidae, Ancylostomatidae), cestodes (e.g. Taeniidae, Anoplocephalidae, Hymenolepidae) and trematodes (e.g. Fasciolidae) in domestic and useful animals such as cattle, sheep, goats, horses, pigs, cats, dogs and birds.

Of particular value on the basis of their good compatability and activity are thio ureas of Formula Ia

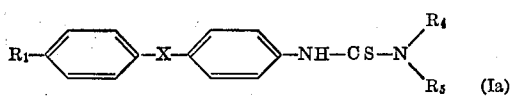

in which $R_1$ is halogen, particularly chlorine, nitro- or a low alkyl group, X is oxygen, sulphur or the imino group (—NH—) and $R_4$ and $R_5$ have the meaning given under Formula I, particularly those in which $R_4$ and $R_5$ together with the nitrogen atom to which they are bonded, form an N-substituted piperazine group.

The new active agents can be used in the form of solutions, emulsions, suspensions, drenches, powders, tablets, boluses, and capsules and can be administered per orally or abomasally to the animals directly, either in a single dose or the dose can be repeated. In most cases, better effect is obtained by protracted administration but results can be obtained with smaller total doses. The active agent or mixtures containing it can also be added to the food or drink for the animals or it can be contained in so-called food premixes.

For preparing application forms, it is customary to use solid carrier materials for example, kaolin, talcum, bentonite, cooking salt, calcium phosphate, carbohydrates, cellulose powder, cotton seed meal, Carbowaxes, gelatine, or liquids such as water, optionally with the addition of surface active agents such as ionic or non-ionic dispersing agents as well as oils or other solvents which are not harmful to the animal organisms. If the anthelmintic agent is to be in the form of a food concentrate, then as carrier materials there may be used for example, energy foods, crop foods or protein concentrates. Such food concentrates can contain apart from the active agent of this invention, other additives such as vitamins, anti-biotics, chemo-therapeutic agents, bacteriostatic agents, fungistatic agents, coccidostatic agents, hormone preparations, materials with anabolic action or other materials which improve growth or influence the quality of the meat of the slaughtered animal or substances which are useful for the animal in other ways.

Suitable dose forms for oral administration such as dragées and tablets preferably contain 100–500 mg. of the active substance according to the invention and indeed, 20–80% of a compound of the General Formula I. For their manufacture the active substance may be combined e.g. with solid powder carrier materials such as lactose, saccharose, sorbitol, mannitol, starches such as potato starch, maize starch or amylo pectin, or laminaria powder or citrus pulp powder, cellulose derivatives or gelatine, optionally wtih the addition of lubricants such as magnesium or calcium stearate or polyethylene glycols, and formed to tablets or dragée cores. The latter is preferably coated for example with concentrated sugar solution which, for example, can contain gum arabic, talc and/or titanium dioxide, or they can be coated with a lacquer dissolved in a highly volatile organic solvent or organic solvent mix. These coatings can also include dyes or pigments in order to be able to characterize various doses of active substance optically.

Determination of anthelmintic action in hens which were infested with *Ascaridia galli*

1–3 day old chicks were artificially infested with eggs of *Ascaridia galli* (helminths). Groups of 5 hens each were used per test. 45 weeks after infestation, the active substance was administered to the animals in 1 dose per day on 3 subsequent days. As control infested hens which were not medicated were used.

Evaluation

The number of *Ascaridia galli* excreted per test group over the course of 5 days after the first administration of the active substances was determined daily and the number still present in the gut on the 5th test day was also determined by section. Additionally, the number of worm-free hens was determined.

Results are shown in the following table.

| Active substance | Daily dose, mg./kg. body weight | No. of *Ascaridia galli* of 5 hens | | | | |
|---|---|---|---|---|---|---|
| | | Excreted during the period of test | | Found on sectioning | No. of worm-free hens | General condition |
| | | Absolute number | Percdnt of total number | | | |
| 4-[4-(4'-nitrophenoxy)-phenyl]-N'N'-diethylthio urea | 750 | 63 | 100 | 0 | 5 | Good. |
| N-[4-(4'-nitrophenoxy)-phenyl]-N'N'-dipropylthio urea | 750 | 47 | 100 | 0 | 5 | Do. |
| N-[4-(4'-nitrophenoxy)-phenyl]-N'N'-dibutylthio urea | 750 | 83 | 100 | 0 | 5 | Do. |
| N-[4-(4'-chlor-3'-methylphenoxy)-phenyl]-N'N'-diethylthio urea | 750 | 30 | 83 | 6 | 4 | Do. |
| N-[4-(4'-nitrophenoxy)-phenyl]-N'N'-dihexylthio urea | 750 | 60 | 100 | 0 | 5 | Do. |
| N-[4-(4'-nitrophenoxy)-phenyl]-N'-methyl-N'-propylthio urea | 750 | 58 | 100 | 0 | 5 | Do. |
| N-[4-(4'-chlorphenoxy)-phenyl]-N'N'-dibutylthio urea | 750 | 12 | 100 | 0 | 5 | Do. |
| N-[4-(4'-methoxyphenoxy)-phenyl]-N'-ethyl-N'-sec. butylthio urea | 750 | 11 | 91 | 1 | 4 | Do. |
| N-[4-(4'-nitrophenoxy)-phenyl]-N'-ethyl-N'-sec. butylthio urea | 750 | 20 | 100 | 0 | 5 | Do. |
| N-[4-(4'-bromanilino)-phenyl]-N'-N'-diethylthio urea | 750 | 50 | 100 | 0 | 5 | Do. |
| N-[4-(3',4'-dimethylanilino)-phenyl)-N'N'-diethylthio urea | 750 | 124 | 93 | 6 | 4 | Do. |
| N-[4-(4'-methoxyanilino)-3-carboxyphenyl]-N'N'-diethylthio urea | 750 | 104 | 100 | 0 | 5 | Do. |
| N-[4-(4'-nitroanilino)-phenyl]-N'N'-dihexylthio urea | 750 | 43 | 100 | 0 | 5 | Do. |
| N-[4-3',4'-dimethylanilino)-phenyl]-N'-ethyl-N'-sec. butylthio urea | 750 | 6 | 85 | 1 | 4 | Do. |
| 4-methoxy-4'-(N-methylpiperazinyl)-thiocarbonylamino-diphenylether | 750 | 125 | 100 | 0 | 5 | Do. |
| 4-nitro-4'-(N-methylpiperazinyl)-thiocarbonylamino-diphenylether | 750 | 125 | 100 | 0 | 5 | Do. |
| 4-methylthio-4'-(N-methylpiperazinyl)-thiocarbonylamino-diphenylamine | 750 | 83 | 95 | 4 | 3 | Do. |
| 4-ethyl-4'-(N-methylpiperazinyl)-thiocarbonylamino-diphenylamine | 750 | 191 | 100 | 0 | 3 | Do. |
| 4-chlor-4'-(N-methylpiperazinyl)-thiocarbonylamino-diphenylamine | 750 | 136 | 100 | 0 | 5 | Do. |

Tests on rats infected with *Fasciola hepatica*

White laboratory rats were artificially infected with liver leeches (*Fasciola hepatica*). After expiry of the preparation time the attack of the rats by liver leech was determined by 3 independent droppings analyses.

For the test, groups of 4 attacked rats were treated with the active substance in the form of a suspension applied via a stomach probe on 3 subsequent days, once daily. In the 3–5 week after administration of the active substance a weekly droppings analysis was carried out on the content of liver leech eggs At the end of 5 weeks from the start of the test, the test animals were killed and the presence of any liver leeches was determined. Results are shown in the following table.

| Active substance | Daily dose in mg./kg. body weight | Droppings control of egg excretion 3 times Before medication | Droppings control of egg excretion 3 times After medication | No. of liver leeches after section | General condition |
|---|---|---|---|---|---|
| N-[4-(4'-nitrophenoxy)-phenyl]-N'N'-dimethylthio urea | 200 | Positive | Negative | 0-0-0-0 | Good. |
| N-[4-(4'-nitrophenoxy)-phenyl]-N'N'-diethylthio urea | 200 | do | do | 0-0-0-0 | Do. |
| N-[4-(4'-nitrophenoxy)-phenyl]-N'N'-dipropylthio urea | 200 | do | do | 0-0-0-0 | Do. |
| N-[4-(4'-chlorphenoxy)-phenyl]-N'N'-diethylthio urea | 150 | do | do | 0-0-0-2 | Do. |
| N-[4-(4'-nitrophenoxy)-phenyl]-N'N'-dibutylthio urea | 200 | do | do | 0-0-0-0 | Do. |
| N-[4-(4'-nitrophenoxy)-2-chlorphenyl]-N'N'-diethylthio urea | 200 | do | do | 5-0-0-0 | Do. |
| N-[4-(4'-nitrophenoxy)-3-chlorphenyl]-N'N'-diethylthio urea | 200 | do | do | 0-0-0-0 | Do. |
| N-[4-(4'-chlorphenoxy)-3-caboxyphenyl]-N'N'-diethylthio urea | 200 | do | do | 0-0-0-0 | Do. |
| N-[4-(4'-nitrophenoxy)-phenyl]-N'N'-pentametyhlenthio urea | 200 | do | do | 0-0-0-0 | Do. |
| N-[4-(4'-nitrophenoxy)-phenyl]-N'N'-dihexylthio urea | 200 | do | do | 0-0-0-0 | Do. |
| N-[4-(4'-nitrophenoxy)-phenyl]-N'-methyl-N'-propylthio urea | 200 | do | do | 0-0-0-2 | Do. |
| N-[4-(4'-aminophenoxy)-phenyl]-N'N'-diethylthio urea | 200 | do | do | 0-0-0-0 | Do. |
| N-[4-(4'-nitrophenoxy)-phenyl]-N'-methyl-N'-ethylthio urea | 200 | do | do | 0-0-0-1 | Do. |
| N-[4-(4'-bromphenoxy)-phenoxy)-phenyl]-N'N'-dihexylthio urea | 200 | do | do | 0-0-0-0 | Do. |
| N-[4-(4'-nitrophenylthio)-phenyl]-N'N'-diethylthio urea | 300 | do | do | 0-0-0-0 | Do. |
| N-[4-(4'-methylanilino)-phenyl]-N'N'-diethylthio urea | 200 | do | do | 0-0-0-0 | Do. |
| N-[4-(4'-chlorphenylthio)-phenyl]-N'N'-diethylthio urea | 200 | do | do | 0-0-0-0 | Do. |
| N-[4-(4'-chlorphenylthio)-3-carboxyphenyl]-N'N'-dimethylthio urea | 200 | do | do | 0-0-1-1 | Do. |
| N-[4-(4'-N,N-dimethylaminoanilino)-phenyl]-N'N'-dibutylthio urea | 200 | do | do | 0-0-0-0 | Do. |
| N-[4-(4'-nitrophenoxy)-phenyl]-N'-ethyl-N'-sec. butylthio urea | 200 | do | do | 0-0-0-0 | Do. |
| N-[4-(4'-methylphenoxy)-phenyl]-N'N'-diethylthio urea | 200 | do | do | 0-0-0-2 | Do. |
| 4-methoxy-4'-(N-methylpiperazinyl)-thiocarbonylamino-diphenylether | 200 | do | do | 2-0-1-0 | Do. |
| 4-methylthio-4'-(N-methylpiperazinyl)-thiocarbonylamino-diphenylamine | 200 | do | do | 0-0-0 | Do. |
| 4-ethyl-4'-(N-methylpiperazinyl)-thiocarbonylamino-diphenylamine | 200 | do | do | 0-0-0-0 | Do. |
| 4-chlor-4'-(N-methylpiperazinyl)-thiocarbonylamino-diphenylamine | 200 | do | do | 0-0-0-0 | Do. |

Tests on mice infected with *Hymenolepis nana*

The active substance was administered to white mice in the form of a suspension by means of a stomach probe, the white mice being artificially infected with *Hymenolepis nana*. Five animals were used per test. Each group of animals had the active substance administered once daily for 3 subsequent days. The animals were killed 8 days after the beginning of treatment and sectioned.

Evaluation after section of the test animals took place by counting the number of ringworms found in the gut. As control, untreated but similarly and simultaneously infected mice were used. The agent was received by the mice without any symptoms. Results re shown in the following table.

Tests on mice infected with Enterobius

The active substance was administered in the form of a suspension to white mice via a stomach probe, the mice having previously been infected with mouse Enterobius. Five animals were used per test. Each group of animals had the active substance administered for 3 subsequent days, once daily.

The daily dose per animal was 750 mg. active substance per kg. of body weight.

On the 6th day after the beginning of the treatment, the animals were killed and sectioned. The evaluation took place after section of the test animals by counting the number of mouse Enterobius in the gut. Similarly infected by untreated mice served as control.

The agent was affected by the mice without symptoms. Results are expressed in the following table.

| Active agents | Daily dose, mg./kg. body weight | Attack of 5 test animals on section | Action on control animals on section |
|---|---|---|---|
| N-[4-(4'-chlorphenoxy)-phenyl]-N'N'-diethylthio urea | 750 | 0-0-0-0-0 | 3-4-15-18-19 |
| N-[4-(4'-nitrobenoxy)-phenyl]-N'N'-dibutylthio urea | 750 | 0-0-0-0-0 | 1-8-11-20-39 |
| N-[4-(4'-methylphenylthio)-phenyl]-N'N'-diethylthio urea | 750 | 0-0-0-3-4 | 1-2-3-4-5 |
| N-[4-(4'-chlorphenylthio)-phenyl]-N'N'-diethylthio urea | 750 | 0-0-0-0-0 | 2-2-7-8-8 |
| N-[4-(4'-chloranilino)-phenyl]-N'N'-diethylthio urea | 750 | 0-0-0-0-1 | 0-1-2-2-4 |
| N-[4-anilinophenyl]-N'N'-diethylthio urea | 750 | 0-0-0-4-5 | 1-2-3-4-5 |
| 4-nitro-4'(N-methylpiperazinyl)-amino-diphenylether | 750 | 0-0-0-1-1 | 0-4-13-13-23 |
| 4-methylthio-4'-(N-methylpiperazinyl)-thiocarbonylamino-diphenylamine | 750 | 0-0-0-0-0 | 11-13-16-23-32 |
| 4-chlor-4'-(N-methylpiperazinyl)-thiocarbonylaminodiphenylamine | 750 | 4-0-0-2-5 | 0-6-7-8-9 |

In this table

+ = animal dead
L = adult form
l = juvenile form

| Active substance | Daily dosage, mg./kg. body weight | Attack of 5 test animals on section | Attack of control animals on section |
|---|---|---|---|
| N-[4-(4'-chlorophenoxy)-phenyl]-N'N'-diethylthio urea | 750 | 0-0-0-0-0 | 8/Ll-8/Ll-14/Ll-15/Ll-20/Ll |
| N-[4-(4'-nitrophenoxy)-phenyl]-N'N'-dibutylthio urea | 750 | 0-0-0-0-0 | 10/l-12/l-13/Ll-16/Ll-20/l |
| N-[4-(4'-methoxyphenoxy)-phenyl]-N'N'-dimethylthio urea | 750 | 0-0-0-1-2/l | 3-5/Ll-6/Ll-7/l-8/Ll |
| N-[4-(4'-nitrophenoxy)-phenyl]-N'N'-ethylenthio urea | 750 | 0-0-0-2-2 | 4/Ll-13/Ll-15/L-18/Ll-20/Ll |
| N-[4-(4'-methoxyphenoxy)-phenyl]-N'N'-dibutylthio urea | 750 | 0-0-1-2/L-3 | +-2-3/L-4/Ll-12/Ll |
| N-[4-(4'-bromphenoxy)-phenyl]-N'N-dihexylthio urea | 750 | 0-0-0-0/l-1/l | +-2-3/L-4/Ll-12/Ll |
| N-[4-(4'-chloranilino)-phenyl]-N'N'-diethylthio urea | 750 | 0-0-0-0-0 | 10/Ll-12/Ll-16/Ll-20/Ll-24/Ll |
| N-[4-(4'-ethylanilino)-phenyl]-N'N'-diethylthio urea | 750 | 0-0-0-0/l-3/Ll | 2/Ll-5/Ll-6/Ll-8/Ll-12/Ll |
| N-[4-(4'-methylanilino)-phenyl]-N'N'-diethylthio urea | 750 | 0-0-0-0-0 | 10/l-12/l-13/Ll-16/Ll-20/l |
| 4-methoxy-4'-(N-methylpiperazinyl)-thiocarbonylamino-diphenylether | 750 | 0-0-0-0/2/2-0/2/3 | 3/1/l-3/2/3-7/3/L-8/8/4-19/4/8 |
| 4-nitro-4'-(N-methylpiperazinyl)-thiocarbonylaminodiphenylether | 750 | 0-0-1-1/lL-3 | 5/9/8-6/5/5-9/9/10-13/2/2-20/10/9 |
| 4-methylthio-4'-(N-methylpiperazinyl)-thiocarbonylamino-diphenylamine | 750 | 0-0-0-0-0 | 5/4/4-6/3/3-10/5/4-12/12/10-17/9/7 |
| 4-ethyl-4'-(N-methylpiperazinyl)-thiocarbonylamino-diphenylamine | 750 | 1/3L-0-0-0-0/l | 3/1/l-3/2/3-7/3L-8/8/4-19/4/8 |
| 4-chlor-4'-(N-methylpiperazinyl)-thiocarbonylamino-diphenylamine | 750 | 1-0-0-0-0 | 3/1/l-3/2/3-7/3L-8/8/4-19/4/8 |

In the following use forms of the new thioureas of General Formula I are described. Parts given are parts by weight.

Pasty active substance concentrates

Such semi-solid or oily active substance concentrates have, for example, the following composition:

(a)

| | Parts |
|---|---|
| N - [4-(4' - nitrophenoxy) - phenyl] - N',N'-dibutyl thiourea | 40 |
| Bolus alba | 10 |
| Sodium lignosulphonate | 2 |
| Sodium benzoate | 0.2 |
| Carboxymethyl cellulose | 1.0 |
| Water | 46.8 |

(b)

| | Parts |
|---|---|
| N - [4 - (4' - chloro-3'-methylphenoxy)-phenyl]-N',N'-diethylthiourea | 30 |
| Peanut oil | 70 |

The active substances were milled together to the finest possible particle size (5–10 microns) together with carriers, distribution agents and other additives. The resulting homogeneous concentrates were administered to domestic and useful animals by means of a drenching pistol. These concentrates were used for the temporary deworming of a number of farm animals, for example, for deworming a flock of sheep attacked by Haemonchus spp., Trichostrongylus spp. etc.

Powder concentrate

For the manufacture of an (a) 50% and (b) 25% powder concentrate the following materials were used:

(a)

| | Parts |
|---|---|
| N - [4 - (4' - nitrophenoxy) - phenyl] - N',N' - diethylthiourea | 50 |
| Polyoxyethylene sorbitan monooleate | 3 |
| Lignisulphonic acid sodium salt | 3 |
| Bolus alba | 44 |

(b)

| | Parts |
|---|---|
| N - 4' - (4' - chlorophenoxy) - phenyl] - N'N' - diethylthiourea | 25 |
| Polyvinylpyrrolidone | 3 |
| Dodecylbenzene sulphonate | 3 |
| Kieselghur | 39 |
| Bolus alba | 30 |

The active substances given were, for example, coated onto the carrier material as an acetonic solution. Thereafter dispersing agents and wetting agents were added thereto and the concentrate milled to homogeneity. Such powder concentrates can be mixed with fodder, added to conventional fodder premixes or can be diluted with water to potable drinks. In addition, these powder concentrates can be directly enclosed in gelatin capsules, and for example, administered to dogs or worked into food in the form of tabletted food pellets.

What we claim is:
1. A compound of the formula

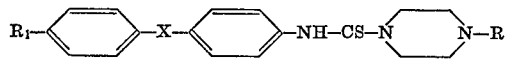

wherein $R_1$ is halogen, nitro or $C_1$–$C_4$ alkoxy; X is oxygen, sulfur or imino; and R is $C_1$–$C_4$ alkyl, $C_1$–$C_4$ hydroxyalkyl, phenyl or benzyl.

2. A compound of the formula

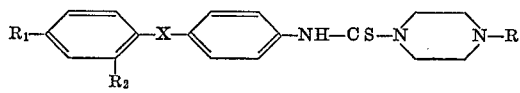

wherein $R_1$ is hydrogen, chlorine, bromine, $C_1$–$C_4$ alkyl, $C_1$–$C_4$ alkylthio or $C_1$–$C_4$ alkoxy; $R_2$ is hydrogen, $C_1$–$C_4$ alkyl or nitro; X is oxygen, sulfur or imino; and R is $C_1$–$C_4$ alkyl, phenyl, $C_1$–$C_4$ hydroxyalkyl or ethoxycarbonyl.

3. A compound according to claim 2 in which $R_1$ is hydrogen, chlorine, bromine, $C_1$–$C_4$ alkyl or $C_1$–$C_4$ alkoxy; $R_2$ is hydrogen; and X is oxygen.

4. The compound according to claim 3 which is 4-methoxy-4'-(N - methylpiperazinyl) - thiocarbonylamino-diphenyl ether.

5. The compound according to claim 3 which is 4-nitro - 4' - (N-methylpiperazinyl)-thiocarbonylamino-diphenyl ether.

6. A compound according to claim 2 in which $R_1$ is hydrogen, chlorine, bromine, $C_1$–$C_4$ alkyl or $C_1$–$C_4$ alkylthio; $R_2$ is hydrogen; X is imino; and R is $C_1$–$C_4$ alkyl, phenyl or $C_1$–$C_4$ hydroxyalkyl.

7. The compound according to claim 6 which is 4-methylthio - 4' - (N - methylpiperazinyl) - thiocarbonyl-amino-diphenylamine.

8. The compound according to claim 6 which is 4-methyl - 4' - (N - methylpiperazinyl)-thiocarbonylamino-diphenylamine.

9. The compound according to claim 6 which is 4-chloro - 4' - (N - methylpiperazinyl)-thiocarbonylamino-diphenylamine.

10. The compound accordinng to claim 6, which is 2,4-dimethyl - 4' - (N - ethylpiperazinyl)-thiocarbonylamino-diphenylamine.

References Cited
UNITED STATES PATENTS

| | | | |
|---|---|---|---|
| 2,948,752 | 8/1960 | Podsesva | 260—552 R |
| 3,117,249 | 4/1965 | Martin | 260—552 R |
| 3,449,419 | 6/1969 | Wechter | 260—268 C |
| 3,590,082 | 6/1971 | Sarett | 260—268 C |
| 2,266,601 | 12/1941 | Howland | 260—552 R |
| 2,723,193 | 11/1955 | Todd | 260—552 R |
| 2,875,175 | 2/1959 | Ambelang | 260—552 R |
| 3,135,748 | 6/1964 | Sheehan | 260—552 R |
| 3,234,275 | 2/1966 | Macz | 260—293.62 |
| 3,365,360 | 1/1968 | Taylor | 260—552 R |
| 3,549,572 | 12/1970 | Mingawa et al. | 260—552 R |
| 3,232,933 | 2/1966 | Gundel | 260—268 C |

DONALD G. DAUS, Primary Examiner

U.S. Cl. X.R.

260—268 PH, 293.85, 454, 468 C, 552 R; 424—250, 267, 322